United States Patent
Eklund et al.

(10) Patent No.: US 12,305,362 B2
(45) Date of Patent: May 20, 2025

(54) METHOD FOR CONTROLLING AN AUTONOMOUS VEHICLE OPERATING AT A WORKSITE

(71) Applicant: VOLVO AUTONOMOUS SOLUTIONS AB, Gothenburg (SE)

(72) Inventors: Linus Eklund, Kullavik (SE); Jimmie Wiklander, Västerås (SE); Johan Sjöberg, Västerås (SE)

(73) Assignee: VOLVO AUTONOMOUS SOLUTIONS AB, Gothenburg (SE)

( * ) Notice: Subject to any disclaimer, the term of this patent is extended or adjusted under 35 U.S.C. 154(b) by 253 days.

(21) Appl. No.: 17/347,007

(22) Filed: Jun. 14, 2021

(65) Prior Publication Data

US 2021/0388577 A1    Dec. 16, 2021

(30) Foreign Application Priority Data

Jun. 15, 2020    (EP) .................................... 20179973

(51) Int. Cl.
*E02F 9/20*    (2006.01)
*B60W 30/14*    (2006.01)
(Continued)

(52) U.S. Cl.
CPC ........... *E02F 9/205* (2013.01); *B60W 30/143* (2013.01); *E02F 9/2045* (2013.01);
(Continued)

(58) Field of Classification Search
CPC ....... E02F 9/205; E02F 9/2045; E02F 3/8866; E02F 3/00; B60W 30/143; G05D 1/0217;
(Continued)

(56) References Cited

U.S. PATENT DOCUMENTS

2001/0021888 A1 *  9/2001  Burns .................. G05D 1/0278
                                                                701/26
2004/0068352 A1 *  4/2004  Anderson ............ G05D 1/0219
                                                                701/25
(Continued)

FOREIGN PATENT DOCUMENTS

EP               3549419 A1 * 10/2019 ............. A01B 69/00
WO     WO-2017089600 A1 *  6/2017 ......... G01C 21/3453
WO        WO 2019/192667 A1    10/2019

OTHER PUBLICATIONS

Extended European Search Report, European Patent Application No. 201799731, filed Jun. 15, 2020, mailed Nov. 19, 2020, 8 pages.
(Continued)

*Primary Examiner* — Christian Chace
*Assistant Examiner* — Nicholas Stryker
(74) *Attorney, Agent, or Firm* — Sage Patent Group

(57) ABSTRACT

The invention relates to a method for controlling an autonomous vehicle in a worksite. The method comprises the steps of: receiving a predetermined trajectory of a work sequence of the autonomous vehicle, the predetermined trajectory including at least a set path and a set speed; adding a pre-defined variation to the predetermined trajectory to form a test trajectory, the variation including at least a variation in set path or set speed; comparing the energy usage over the test trajectory and the predetermined trajectory; determining whether or not the compared energy usage achieves a pre-set criteria; and setting the test trajectory as a new set trajectory of the autonomous vehicle in response to determining that the compared energy usage achieves the pre-set criteria.

20 Claims, 3 Drawing Sheets

(51) Int. Cl.
*G05D 1/00* (2024.01)
*G05D 1/43* (2024.01)
*G05D 1/644* (2024.01)

(52) U.S. Cl.
CPC .............. *G05D 1/0217* (2013.01); *G05D 1/43* (2024.01); *G05D 1/644* (2024.01)

(58) Field of Classification Search
CPC ............ G05D 1/644; G05D 1/00; G05D 1/12; G05D 1/0221; G05D 1/0223; G05D 1/43; G05D 2201/0202; G05D 2201/0216
USPC .......................................................... 701/50
See application file for complete search history.

(56) References Cited

U.S. PATENT DOCUMENTS

| | | |
|---|---|---|
| 2009/0177335 A1 | 7/2009 | Young et al. |
| 2012/0226407 A1 | 9/2012 | Noordam |
| 2015/0301533 A1* | 10/2015 | Preston ................. B61L 25/026 701/50 |
| 2018/0321683 A1 | 11/2018 | Foster et al. |
| 2019/0192667 A1 | 6/2019 | Senderoff et al. |
| 2020/0012975 A1* | 1/2020 | Shimell ................ G06Q 10/047 |
| 2020/0089241 A1 | 3/2020 | Kao et al. |
| 2020/0139954 A1* | 5/2020 | Wallstedt ................ G06F 16/29 |
| 2020/0149248 A1* | 5/2020 | Ram-On ................ E01C 19/004 |
| 2020/0240116 A1* | 7/2020 | Cheng ................... E02F 9/2045 |
| 2021/0080963 A1* | 3/2021 | Skillsater ............. G05D 1/0217 |
| 2021/0149391 A1* | 5/2021 | Ready-Campbell .... E02F 9/225 |

OTHER PUBLICATIONS

Office Action: Communication pursuant to Article 94(3) EPC, EP Patent Application No. 20179973.1, mailed Jan. 30, 2023, 5 pages.
Decision of Rejection for Chinese Patent Application No. 202110654756.8, mailed Feb. 23, 2024, 16 pages.

* cited by examiner

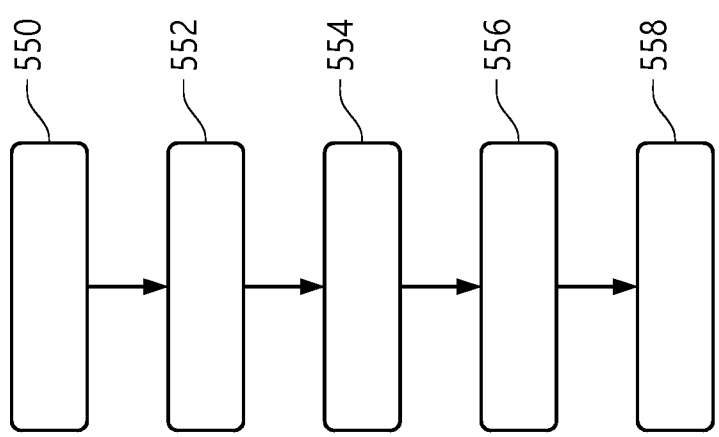

METHOD FOR CONTROLLING AN AUTONOMOUS VEHICLE OPERATING AT A WORKSITE

CROSS REFERENCE TO RELATED APPLICATIONS

This application claims foreign priority to European Patent Application No. 20179973.1 filed on Jun. 15, 2020, the disclosure and content of which is incorporated by reference herein in its entirety.

TECHNICAL FIELD

The present invention relates to a method for controlling an autonomous vehicle in a worksite. The invention is applicable on autonomous vehicles, for example working machines within the fields of industrial construction machines and in particular haulers and excavators. Although the invention will be described with respect to a hauler and an excavator, the invention is not restricted to these particular working machines, but may be used in other construction equipment or in other vehicles, such as wheel loaders, trucks, etc.

BACKGROUND

In connection with transportation of e.g. loads at a worksite, e.g. a construction site or a quarry, working machines in the form of haulers, excavators, wheel loaders, trucks or dumpers are frequently used. In its simplest configuration, the working machines are arranged to receive a load in a container or the like arranged on the vehicle, at a loading location or loading position of the worksite and drive, or otherwise move, to an unloading position or unloading location of the worksite, where it unloads the carried load. At the unloading location/position, the loads are taken care of. For example, at a quarry, large stone material transported to the unloading location/position are subject to a crusher.

Efficient use of energy of the working machines is desirable to reduce costs and environmental impact. Moreover, autonomous operation of the worksite, or at least the working machines operating at the worksite may contribute to an efficient work at the worksite, and may further reduce unnecessary costs. However, a worksite may be relatively complex, with multiple options for choosing the trajectory of the work sequence of the autonomous working machine. For example, the trajectory may be varied by varying the path between the loading and unloading locations/positions and/or by varying the speed over the travelled path. It is thus very time consuming to manually find out the best trajectory, and to program the autonomous working machine to operate accordingly. Moreover, choosing the best trajectory may change over time as the worksite evolves, further complicating the process.

Thus, there is a need in the industry for an improved control of autonomous vehicles at the worksite.

SUMMARY

An object of the invention is to provide a method for controlling an autonomous vehicle in a worksite, which method compares the energy usage over a test trajectory and a predetermined trajectory.

According to a first aspect of the invention, there is provided a method for controlling an autonomous vehicle in a worksite. The method comprises the steps of:

receiving a predetermined trajectory of a work sequence of the autonomous vehicle, the predetermined trajectory including at least a set path and a set speed, adding a pre-defined variation to the predetermined trajectory to form a test trajectory, the variation including at least a variation in set path or set speed, comparing the energy usage over the test trajectory and the predetermined trajectory, determining whether or not the compared energy usage achieves a pre-set criteria, setting the test trajectory as a new set trajectory of the autonomous vehicle in response to determining that the compared energy usage achieves the pre-set criteria.

Hereby, energy usage of the autonomous vehicle can be improved. Moreover, by determining whether or not the compared energy usage achieves a pre-set criteria, sub-optimization of the autonomous vehicle can effectively be avoided. For example, if the compared energy usage alone indicates that the test trajectory is beneficial over the predetermined trajectory, but the elapsed time of the work sequence for the test trajectory greatly exceeds the elapsed time of the work sequence for the predetermined trajectory, an action comparing the gain of the energy usage with the loss in elapsed time of the work sequence should be carried out to avoid undesired changes of the set trajectory. This is achieved by that the compared energy usage achieves a pre-set criteria.

According to at least one example embodiment, the predetermined trajectory is pre-set, indicating that the work sequence of the autonomous vehicle is known beforehand. The predetermined trajectory is thus typically the set trajectory including at least the set path and set speed of the work sequence prior to performing the method of the invention.

According to at least one example embodiment, the pre-defined variation is a variation of known character to at least the set path or set speed of the trajectory. The pre-defined variation may e.g. be a pre-defined change in the set path or set speed, such as e.g. an intended change in at least a portion of the set path, or intended change in the set speed along at least a portion of the associated path. Thus, the pre-defined variation is a variation or change is an intended change or known character, different to e.g. a variation or change caused of external factors such as encountering and possibly recording of an unknown or unacquainted obstacle along the path of the autonomous vehicle. The pre-defined variation may be determined by simulations, e.g. by using the known set path and using topographical/map info to add a variation in set path.

According to at least one example embodiment, the test trajectory comprises the set path and set speed (i.e. the path and speed settings) of the predetermined trajectory with the exception of the pre-defined variation. In other words, the test trajectory comprises a test path and a test speed, wherein at least one of the test path and test speed is different to the set path and set speed of the predetermined trajectory.

According to at least one example embodiment, the energy usage of the work sequence corresponding to the predetermined trajectory typically is known, or it is determined/estimated during the performance of such work sequence. Correspondingly, the energy usage of the work sequence corresponding to the test trajectory may be determined/estimated during the performance of such work sequence. However, according to at least one example embodiment, the energy usage of the work sequence of at least one of the predetermined trajectory and test trajectory is simulated. For example, the energy usage of the test trajectory may be simulated by using known energy usage related to the predetermined trajectory, and estimated energy usage related to the pre-defined variation, e.g. by using topographical/map info or other information of the terrain.

It should be understood that if the compared energy usage does not achieve the pre-set criteria, the predetermined trajectory is typically kept as the set trajectory.

According to at least one example embodiment, the pre-set criteria is at least that the test trajectory has lower energy usage than the predetermined trajectory.

Hereby, the determination of whether the test trajectory is to be set as the new set trajectory is simplified. Thus, according to such embodiments, the method will not result in new set trajectory which has a higher energy usage compared to the predetermined trajectory.

According to at least one example embodiment, the pre-set criteria is at least that the compared energy usage is related to one of the following: elapsed time of the work sequence, elapsed time of the set path, minimum average speed, maximum allowed vibration, desired battery usage.

Hereby, the determination of whether the test trajectory is to be set as the new set trajectory can be based on desired characteristics or set limits of the working sequence. For example, a maximum elapsed time of the work sequence or set path may be used to not change the new set trajectory to the test trajectory even if the energy usage of the test trajectory is improved compared to the predetermined trajectory. According to another example embodiment, the test trajectory is set as new set trajectory based on a relation of the gain in energy usage and penalty of the elapsed time of the work sequence or set path. Corresponding relations can be made additionally or alternatively between the energy usage and the minimum average speed, maximum allowed vibration and desired battery usage.

According to at least one example embodiment, the method comprises performing a plurality of test trajectories, and comparing the energy usage between the predetermined trajectory and each test trajectory, and subsequently moving forward with the most promising test trajectory. The most promising test trajectory e.g. being related to the lowest energy consumption. Hereby, a local minimum may be avoided.

According to at least one example embodiment, the pre-defined variation includes noise, or a step-change in set path and/or set speed.

Such noise or step-change is advantageous to use as pre-defined variation as the resulting test trajectory easily can be compared and evaluated based on the variation. For example, if the pre-defined variation is a step-change in set speed at a certain portion of the set-path, and the resulting energy usage of the test trajectory increases, a corresponding, but opposite step-change may be carried out to evaluate if the resulting energy usage of the test trajectory instead decreases.

According to at least one example embodiment, the noise comprises a random signal of a known size and characteristics, set in relation to how much it is allowed to be varied. For example, the noise is a colored noise or a pseudo random signal with a chosen bandwidth.

According to at least one example embodiment, the autonomous vehicle further comprises an auxiliary equipment configured to perform work such as digging or loading, and wherein the predetermined trajectory comprises the action of performing work of the autonomous vehicle.

Hereby, the energy usage of any auxiliary equipment may be included in the compared energy usage.

According to at least one example embodiment, the trajectory of the work sequence corresponds to the trajectory of the auxiliary equipment of the autonomous vehicle, such as e.g. a tool being e.g. the boom and bucket of an excavator, or drilling tool of a driller, and/or the trajectory of the work sequence corresponds to the trajectory of autonomous vehicle itself, i.e. the path along which the autonomous vehicle propels. Both these types of trajectories are related to energy usages. For the trajectory of the auxiliary equipment of the autonomous vehicle, energy is used during the association action of the auxiliary equipment, and as the auxiliary equipment is moved. The auxiliary equipment may e.g. be moved from a starting position to a target position, or an action position in which a tool of the auxiliary equipment performs the associated action, and possibly further moved to a final position (which e.g. may be the same as the starting position). Such movement of the auxiliary equipment and performing of the association action is an example of a work sequence of the autonomous vehicle. For the trajectory of the autonomous vehicle itself, energy is used for propelling the autonomous vehicle, and energy is additionally used for any action performed during the propelling of the autonomous vehicle, e.g. loading, dumping and/or carrying a load in case the autonomous vehicle is a dumper or hauler. The autonomous vehicle may e.g. be moved from a starting location to a target location, or an action location in which a tool of the auxiliary equipment performs the associated action, and possibly further moved to a final location (which e.g. may be the same as the starting location). Such movement of the autonomous vehicle, and potentially any action performed during the movement, is another example of a work sequence of the autonomous vehicle.

Thus, and according to at least one example embodiment, the trajectory generally includes a path along which the auxiliary equipment and/or autonomous vehicle moves, and the speed of the auxiliary equipment and/or autonomous vehicle along the path, respectively.

According to at least one example embodiment, the pre-defined variation is a variation in at least the action of performing work, or the path position of the action of performing work.

Hereby, the energy usage in relation to performing work may be improved, in correspondence with the pre-set criteria.

According to at least one example embodiment, the autonomous vehicle is configured for carrying a load, and wherein the pre-defined variation includes at least a variation of the set path by the load carrying distance of the autonomous vehicle.

Hereby, the energy usage in relation to portion of the set path which is subject to carrying a load may be improved, in correspondence with the pre-set criteria. For example, the action location may be a location in which the autonomous vehicle receives a load, and the target location a location in which the load is dumped. The pre-defined variation may thus be a variation in set path between the action location and the target location.

According to at least one example embodiment, the set path corresponds to a travel distance of the autonomous vehicle from a starting location to a target location, and/or corresponds to a travel distance of an auxiliary equipment of the autonomous vehicle from a starting position to a target position.

Hereby, the set path can be readily defined and compared between the determined trajectory and the test trajectory, e.g. related to energy usage and elapsed time of the work sequence or other desired parameter.

According to at least one example embodiment, the predetermined trajectory comprises a set path having a starting location and a target location and/or a starting position and a target position, and wherein the test trajectory comprises a set path having the same starting location and target location and/or the same starting position and target position, respectively.

Thus, the pre-determined variation is at least a variation in set path somewhere between the staring location/position and target location/position, or a variation in set speed. Hereby, the compared energy usage can be carried out for the autonomous vehicle performing the same or similar tasks, or at least starting from the same location or position, and ending in the same location or position. Thus, the pre-defined variation is bounded or limited, so as to not affect the movement of the autonomous vehicle in an undesired manner.

According to at least one example embodiment, the pre-defined variation includes a variation in set path of a pre-defined path-portion between the starting location and target location or between the starting position and target position.

Such pre-defined path-portion may correspond to a portion of the set path with known high energy usage, or known cumbersome terrain. By directing the pre-defined variation to such pre-defined path-portion, various test trajectories can be performed with a targeted effort to improve the performance at this specific path-portion.

According to at least one example embodiment, the set path of the predetermined trajectory is a first path, and the set path of the test trajectory is a second path, wherein the second path is different to the first path.

Hereby, the compared energy usage can be carried out for the autonomous vehicle for two different paths or routes. The second path may be only partly different to the first path as previously stated, or the second path may be wholly different to the first path. According to at least one example embodiment, the first path and the second path share the same starting location/position and/or the same target location/position, but nothing beyond that. Stated differently, the first path and the second path only overlap at the starting location/position and/or the target location/position. According to at least one example embodiment, the first path does not overlap with the second path.

According to at least one example embodiment, the second path is shorter compared to the first path.

A shorter path typically results in a lower energy usage and/or a lower elapsed time of the work sequence or set path.

According to at least one example embodiment, the pre-defined variation includes at variation in set path based on more favorable road conditions, such as e.g. a more favorable terrain.

According to at least one example embodiment, the autonomous vehicle comprises a memory, and wherein the memory is configured to store historical data relating to a travelled path of the autonomous vehicle having a travelled speed, as a predetermined trajectory.

That is, the predetermined trajectory is a historically performed trajectory, with the set path being the travelled path and the set speed being the travelled speed. The historical data may furthermore comprise the historical energy usage of the predetermined trajectory.

According to at least one example embodiment, the autonomous vehicle comprises a motor and a battery configured to supply energy to the motor, and wherein the method further comprises measuring the energy usage of the battery for the predetermined trajectory and the test trajectory.

Hereby, the energy usage can be readily defined and compared between the determined trajectory and the test trajectory.

Additionally or alternatively, the battery furthermore energizes any auxiliary equipment of the autonomous vehicle, preferably by a power take off arrangement.

According to at least one example embodiment, the battery comprises a plurality of battery units, wherein at least one battery is configured to energize the motor, and at least one battery is configured to energize the auxiliary equipment.

According to at least one example embodiment, the autonomous vehicle is a working machine.

The working machine may e.g. be an autonomous dumper, hauler or excavator. The working machine may be a driller or crusher.

According to at least one example embodiment, the predetermined trajectory comprises an uphill path-portion, and the pre-defined variation includes a variation in the set path to avoid the uphill path-portion, or a variation in the set speed prior to, or during, the uphill path-portion.

Hereby, the compared energy usage can be carried out for the autonomous vehicle for different ways to manage the uphill path-portion. Uphill is a typically path portion associated with increased energy usage. For example, the set speed of the autonomous vehicle may be set higher prior to the uphill path-portion in order to carry on a higher inertia into the uphill path-portion.

According to at least one example embodiment, the pre-defined variation is bounded by safety parameters and vehicle limitations.

Hereby, the inclusion of the pre-defined variation will not risk causing the autonomous vehicle to be operated outside of such safety parameters or vehicle limitations.

According to a second aspect of the present invention a computer program is provided. The computer program comprising program code means for performing the steps of the first aspect of the invention, when the program is run on a computer.

According to a third aspect of the present invention a computer readable medium carrying a computer program is provided. The computer readable medium carrying a computer program comprising program code means for performing the steps of the first aspect of the invention, when the program is run on a computer.

Effects and features of the second and third aspects of the invention are largely analogous to those described above in connection with the first aspect of the invention.

According to a fourth aspect of the present invention, an autonomous vehicle, such as autonomous working machine, is provided. The autonomous vehicle comprises a computer program according to the second aspect of the invention, or a computer readable medium carrying a computer program according to the third aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings:

FIG. 3 is a flow chart outlining the general steps of a method according to an embodiment of the invention.

DETAILED DESCRIPTION OF EXAMPLE EMBODIMENTS OF THE INVENTION

Figure 1:
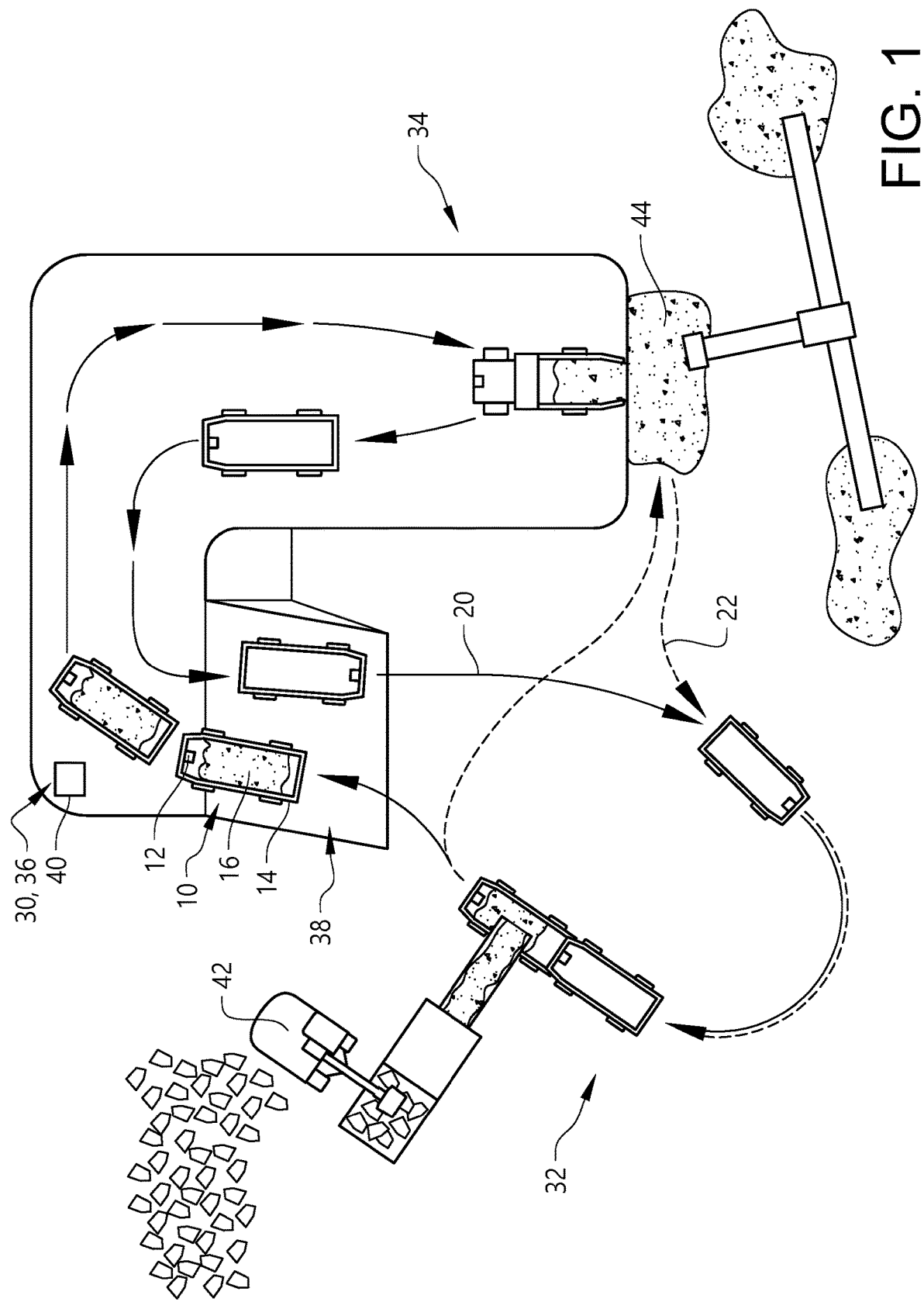
FIG. 1 is a top view of a worksite in which an autonomous vehicle in the form of a hauler is controlled to operate according to an embodiment of the invention.

The present invention will now be described more fully hereinafter with reference to the accompanying drawings, in which exemplary embodiments of the invention are shown. The invention may, however, be embodied in many different forms and should not be construed as limited to the embodiment set forth herein; rather, these embodiments are provided for thoroughness and completeness. Like reference character refer to like elements throughout the description. In the present detailed description, various embodiments of the method according to the present invention are mainly discussed with reference to a hauler carrying a load from a loading location to an unloading location at a worksite, and an excavator digging at a desired spot and moving the dug load to another position. It should be noted that this by no means limits the scope of the present invention which is equally applicable to a wide range of different autonomous vehicles, specifically working machines, operating between a staring location or starting position and target location or target position, respectively.

Figure 2:
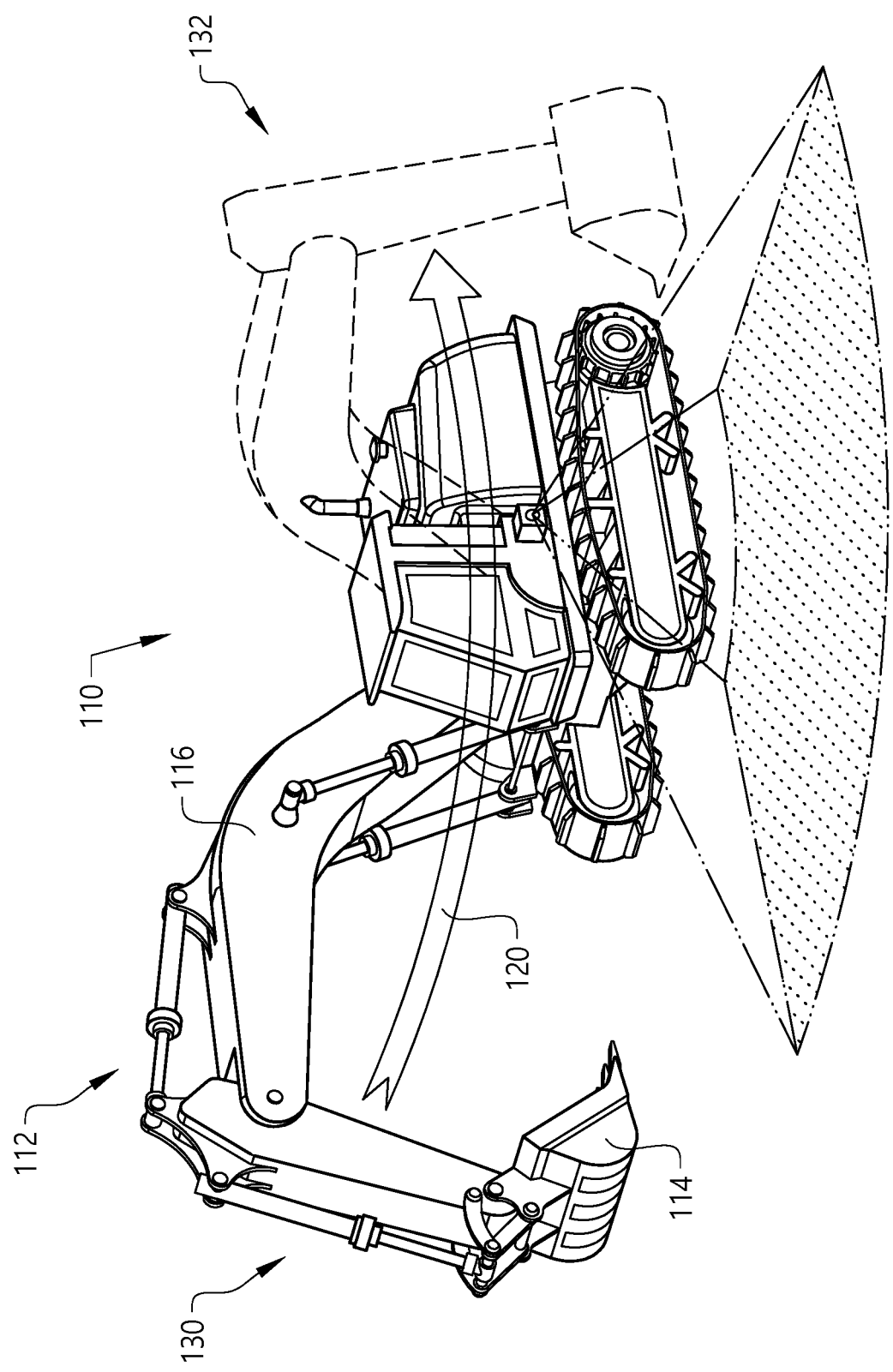
FIG. 2 is a perspective view of an excavator controlled to operate at a worksite according to an embodiment of the invention.

In FIG. 1 and FIG. 2 embodiments of the present invention are described with reference to the operation and control of an autonomous vehicle in a worksite. In FIG. 1 the autonomous vehicle is a working machine exemplified as a hauler and in FIG. 2 the autonomous vehicle is a working machine exemplified as an excavator. In FIG. 3, a method for controlling an autonomous vehicle in a worksite is described with reference to a flow chart.

FIG. 1 is a perspective view of a worksite in the form of a quarry, in which a hauler 10 is operating. The number of haulers or other autonomous vehicles operating at the worksite is exemplifying. It should be realized that there may be more haulers or other autonomous vehicles operating at the worksite. At least some of the haulers or other autonomous vehicles may be members of a common collaborative group, i.e. a group of autonomous vehicles collaborating in performing a specific task.

The hauler 10 in FIG. 1 is controlled to operate according to a predetermined trajectory including at least a set path 20 and a set speed. The set speed may vary along the set path 20. The hauler 10 is typically equipped with hardware and software resources 12, e.g. a memory, comprising the predetermined trajectory, or means for receiving instructions of operating according to the predetermined trajectory. For example, the memory may be configured to store historical data relating to a travelled path with associated travelled speed, here represented by the set path 20 as it is assumed that the hauler 10 at least once have been operated according to the predetermined trajectory, while recording and storing data on the memory. The hauler 10 further comprises a motor, such as an electric motor, for at least propelling the hauler 10, and at least one battery configured to supply energy to the motor. Moreover, the hauler 10 comprises auxiliary equipment configured to perform work, here in the form of a container 14 for carrying a load 16, and means for operating the container 14, typically tilting cylinders for tilting the container 16 in order to dump or discharge the load 16. The auxiliary equipment is preferably energised by the at least one battery. The hardware and software resources 12 of the hauler 10 may furthermore be configured to measure the energy usage of the battery as the hauler 10 operates (i.e. propels and/or performs work) in the worksite.

The set path 20 in FIG. 1 extends from a starting location 30, in which the hauler 10 may be stationed when being charged at a charging station 40, to a first target location 32 being a loading location 32 in which the hauler 10 receives a load 16 from a feeding crusher 42, further to a second target location 34 being an unloading location in which the hauler 10 unloads or discharges the load 16 at an unloading site 44, and a final location 36, here being the same as the starting location 30 where the hauler 10 may be stationed and/or charged. In the particular example in FIG. 1, the hauler 10 may initially begin at the starting location 30, and then directly move to the loading location 32 without passing the unloading location 34. After having received a load 16 at the loading location 32, the hauler typically operates between the loading location 32 and the unloading location 34, until further charging is needed, or another type of change in path is desired or need. Thus, the hauler 10 operates according to a work sequence, following the predetermined trajectory and the set path 20, here being the travelled distance from the staring location 30 to the final location 36. In the specific example of FIG. 1, the work sequence is a work cycle. It should be noted that during the work sequence, the hauler 10 needs not to stop at the starting location 30 or the final location 36, but may operate between the two target locations 32, 34 in order to repeatedly receiving a load and discharging the load as previously mentioned. Alternatively, the set path 20 of the predetermined trajectory neglects the charging station 40, and sets the first target location 30 at the feeding crusher 42 as "starting location" and the second target location 34 at the unloading site 44 as "target location". In such embodiments, the set path may include a final location being the same as the staring location in order to operate the hauler 10 in a work cycle. According to at least one example embodiment, the hauler 10 comprises several predetermined trajectories of different working sequences, e.g. one related to charging the hauler 10, and one related to operating the hauler 10 between the feeding crusher 42 and the unloading site 44.

Thus, in the specific example of FIG. 1, the predetermined trajectory of the hauler 10 comprises the set path 20 by which the hauler 10 is propelled, and comprises the action of performing work, e.g. carrying a load between the first target location 32 and the second target location 34, as well as tilting the container 14 for discharging the load 16 at the second target location 34.

According to the method of the invention, the predetermined trajectory is subject to an added pre-defined variation to form a test trajectory, which is further described with reference to FIG. 3. The pre-defined variation may e.g. include a variation in set path 20 or set speed over at least a portion of the set path 20, compared to the predetermined trajectory.

In FIG. 1, the set path 22 of the test trajectory is indicated by a dashed line 22, extending from the first target location 32 at the feeding crusher 42 to the second target location 34 at the unloading site 44. Thus, FIG. 1 illustrates a first path 20 being the set path 20 of the predetermined trajectory, and a second path 22 being the set path 22 of the test trajectory. As shown in the example embodiment of FIG. 1, the second path 22 is shorter than the first path 20. In more detail, the second path 22 is arranged to avoid the uphill path-portion 38 of the first path 20, and to in a more direct manner reach the unloading site 44 (the uphill portion 38 is indicated with a sloped surface in a partly perspective view in FIG. 1).

Hereby, energy usage of the working sequence of the test trajectory and the second path 22 may be decrease compared to operating the hauler 10 according to the predetermined trajectory, as a result of the relatively shorter path, and the avoidance of the uphill path-portion 38. In the example of FIG. 1, the pre-defined variation for forming the test trajectory also includes a variation in the action of performing work as the load carrying distance of the hauler 10 of the second path 22 is shorter compared to the load carrying distance of the hauler 10 of the first path 20.

Moreover, the second path 22 is not drawn via the charging station 40, and does not reach the same elevation as compared to the first path 20 (the high elevation of the first path 20 may e.g. facilitate discharge of the load at the unloading site 44). However, to operate the hauler 10 along the second path 22 may still be beneficial, at least for a time until discharge of load at the unloading site 44 need to be carried out from an increased elevation (as provided by the first path 20) or when the hauler 10 needs to be charge at the charging station 40. According to another example embodiment, the pre-defined variation is a variation of the set speed, e.g. prior to the uphill path-portion 38. In such example, the set path of the test trajectory will be the same as the set path 20 of the predetermined trajectory, but the trajectories will differ as the set speed of a least a portion of the set path 20 differ. The criteria for choosing to operate the hauler 10 according to the predetermined trajectory or the test trajectory is further described with reference to FIG. 3.

FIG. 2 illustrates an example embodiment in which the autonomous vehicle 110 is at a standstill, but nevertheless is controlled according to the method of the invention. In FIG. 2, the autonomous vehicle is an excavator 110 comprising auxiliary equipment 112 such as a bucket 114, and a boom 116. The excavator 110 may be correspondingly equipped with regards to carrying out the method of the invention as the hauler 10 in FIG. 1. Thus, the excavator 110 may comprise hardware and software resources, such as e.g. a memory, and at least one battery and motor for propelling the excavator, as well as for energizing the action of performing work by the auxiliary equipment 112.

The excavator 110 in FIG. 2 is controlled to be operated according to a predetermined trajectory including at least a set path 120 and a set speed. Compared to the set path 20 described with reference to FIG. 1, the autonomous vehicle of FIG. 2 is not propelled along the set path 120, but instead the set path 120 describes the distance travelled by moving the auxiliary equipment 112, i.e. here the boom 116 and the bucket 114.

The set path 120 in FIG. 2 extends from a starting position 130, in which the auxiliary equipment 112 is arranged such that the bucket 114 may dig at a desired spot, to a target position 132, in which the excavator 110 discharges or dumps the load of the bucket 114. Subsequently, the auxiliary equipment 112 may be moved to a final position, e.g. by being returned to the starting position 130. Thus, the excavator 110 operates according to a work sequence, following the predetermined trajectory and the set path 120, here being the travelled distance from the staring position 130 to the target position 132. Additionally, or alternately the work sequence of the excavator 110 includes propelling the excavator 110 from standstill (i.e. representing a starting location) to a target location. For example, the starting position 130 in which the bucket 114 dig at the desired spot may be located at the current standstill location, wherein the target position 132 in which the excavator 110 discharges or dumps the load of the bucket 114, may be located at the target location. Thus, in the specific example of FIG. 2, the predetermined trajectory of the excavator 110 comprises the set path 120 by which the auxiliary equipment 112 is moved, and may additionally comprise the movement of the excavator 110 itself as it is moved from standstill to a target location.

Corresponding to the hauler 10 in FIG. 1, the predetermined trajectory of the excavator 110 is subject to an added pre-defined variation to form a test trajectory. The pre-defined variation may e.g. include a variation in set path 120 or set speed over at least a portion of the set path 120, compared to the predetermined trajectory. The criteria for choosing to operate the excavator 110 according to the predetermined trajectory or the test trajectory is further described with reference to FIG. 3.

FIG. 3 is a flow chart describing the steps in accordance with embodiments of the invention. The method described in FIG. 3 may be used in accordance with the hauler 10 of FIG. 1 and/or the excavator 110 of FIG. 2. Preferably, at least some of the steps of the method is provided by a computer program, or computer readable medium carrying a computer program. The computer program comprising program code means for performing the steps of the method described with reference to FIG. 3, when the program is run on a computer, e.g. a hardware resource of the autonomous vehicle.

In step 550 a predetermined trajectory of a work sequence of the autonomous vehicle is received. The predetermined trajectory includes at least a set path and a set speed. Example of such predetermined trajectories with work sequences are provided in FIG. 1 and FIG. 2. Moreover, the predetermined trajectory may comprise the action of performing work of the auxiliary equipment of the autonomous vehicle.

In step 552, a pre-defined variation is added to the predetermined trajectory to form a test trajectory. The pre-defined variation includes at least a variation in set path or set speed. As already described with reference to FIG. 1 and FIG. 2, the pre-defined variation may additionally include a variation in the action of performing work of the auxiliary equipment, or the path position of the action of performing work, e.g. the load carrying distance of the hauler 10 of FIG. 1. The pre-defined variation may comprise or consist of noise, or a step-change in set path and/or set speed. Additionally or alternatively, the pre-defined variation is bounded by safety parameters and vehicle limitations.

In step 554, the energy usage over the test trajectory and the predetermined trajectory is compared. Of course, the method may include implicit steps as determining the energy usage of the predetermined trajectory and/or the test trajectory, e.g. by calculating energy usage of the at least one battery of the autonomous vehicle.

In step 556, it is determined whether or not the compared energy usage achieves a pre-set criteria. The pre-set criteria may e.g. be at least that the test trajectory has lower energy usage than the predetermined trajectory. The pre-set criteria may additionally or alternatively relate the compared energy usage with the elapsed time of the work sequence, elapsed time of the set path, minimum average speed, maximum allowed vibration, and/or desired battery usage.

In step 558, the test trajectory is set as a new set trajectory of the autonomous vehicle in response to determining that the compared energy usage achieves the pre-set criteria. If it is determined that the compared energy usage does not achieve the pre-set criteria, the predetermined trajectory is kept, or a new test trajectory is performed (according to step 552) with the subsequent steps.

It should be understood that the autonomous vehicle is typically equipped with hardware and software resources known to the skilled person, e.g. associated hardware resources such as e.g. processing units being provided in the form of one or more processors together with process software including computer program memory including computer program code for performing the method of the invention.

It is to be understood that the present invention is not limited to the embodiments described above and illustrated in the drawings; rather, the skilled person will recognize that many changes and modifications may be made within the scope of the appended claims.

The invention claimed is:

1. A method for controlling an autonomous vehicle in a worksite, the method comprising the steps of:
   receiving, by a processor of the autonomous vehicle, a predetermined trajectory of a work sequence of the autonomous vehicle, the predetermined trajectory including at least a set path and a set speed,
   adding, by the processor, a pre-defined variation including noise of a random signal of a known size and characteristics to the predetermined trajectory to form a test trajectory, the variation including at least a variation in set path,
   comparing, by the processor, the energy usage over the test trajectory and the predetermined trajectory,
   determining, by the processor, whether or not the compared energy usage achieves a pre-set criteria,
   setting, by the processor, the test trajectory as a new set trajectory of the autonomous vehicle in response to determining that the compared energy usage achieves the pre-set criteria, and
   controlling, by the processor, the autonomous vehicle in the worksite to operate according to the predetermined trajectory with the new set trajectory,
   wherein the pre-set criteria is at least that the compared energy usage is related to at least one of the following: elapsed time of the work sequence, elapsed time of the set path, maximum allowed vibration, or desired battery usage.

2. The method according to claim 1, wherein the pre-set criteria is at least that the test trajectory has lower energy usage than the predetermined trajectory.

3. The method according to claim 1, wherein the autonomous vehicle further comprises an auxiliary equipment configured to perform work, and wherein the predetermined trajectory comprises the action of performing work of the autonomous vehicle.

4. The method according to claim 3, wherein the pre-defined variation is a variation in at least the action of performing work, or the path position of the action of performing work.

5. The method according to claim 1, wherein the autonomous vehicle is configured for carrying a load, and wherein the pre-defined variation includes at least a variation of the set path by the load carrying distance of the autonomous vehicle.

6. The method according to claim 1, wherein the set path corresponds to a travel distance of the autonomous vehicle from a starting location to a target location, and/or corresponds to a travel distance of an auxiliary equipment of the autonomous vehicle from a starting position to a target position.

7. The method according to claim 6, wherein the predetermined trajectory comprises a set path having a starting location and a target location and/or a starting position and a target position, and wherein the test trajectory comprises a set path having the same starting location and target location or the same starting position and target position, respectively.

8. The method according to claim 7, wherein the pre-defined variation includes a variation in set path of a pre-defined path-portion between the starting location and target location or between the starting position and target position.

9. The method according to claim 1, wherein the set path of the predetermined trajectory is a first path, and the set path of the test trajectory is a second path, wherein the second path is different to the first path.

10. The method according to claim 9, wherein the second path is shorter compared to the first path.

11. The method according to claim 1, wherein the autonomous vehicle comprises a memory, and wherein the memory is configured to store historical data relating to a travelled path of the autonomous vehicle having a travelled speed, as a predetermined trajectory.

12. The method according to claim 1, wherein the autonomous vehicle comprises a motor and a battery configured to supply energy to the motor, and wherein the method further comprises measuring the energy usage of the battery for the predetermined trajectory and the test trajectory.

13. The method according to claim 1, wherein the autonomous vehicle is a working machine configured to perform at least one of digging and loading.

14. The method according to claim 1, wherein the predetermined trajectory comprises an uphill path-portion, and wherein the pre-defined variation includes a variation in the set path to avoid the uphill path-portion, or a variation in the set speed prior to, or during, the uphill path-portion.

15. An autonomous vehicle, comprising a computer program according to claim 1.

16. A computer readable medium carrying a computer program comprising program code means for performing the steps of claim 1 when the program product is run on a computer.

17. An autonomous vehicle, comprising a computer readable medium carrying a computer program according to claim 1.

18. A method for controlling an autonomous vehicle in a worksite, the method comprising the steps of:
   receiving, by a processor of the autonomous vehicle, a predetermined trajectory of a work sequence of the autonomous vehicle, the predetermined trajectory including at least a set path and a set speed, wherein the set path includes a distance to be traveled by an auxiliary equipment of the autonomous vehicle,
   adding, by the processor, a pre-defined variation to the predetermined trajectory to form a test trajectory, the variation including at least a variation in set path,
   comparing, by the processor, the energy usage over the test trajectory and the predetermined trajectory,
   determining, by the processor, whether or not the compared energy usage achieves a pre-set criteria,
   setting, by the processor, the test trajectory as a new set trajectory of the autonomous vehicle in response to determining that the compared energy usage achieves the pre-set criteria, and
   controlling, by the processor, the autonomous vehicle in the worksite to operate according to the predetermined trajectory with the new set trajectory,
   wherein the pre-set criteria is at least that the compared energy usage is related to at least one of the following:

elapsed time of the work sequence, elapsed time of the set path, maximum allowed vibration, or desired battery usage.

19. The method of claim 18, wherein the auxiliary equipment is a tool of a boom, a bucket of an excavator, or a drilling tool of a driller.

20. The method of claim 18, wherein the autonomous vehicle is not propelled along the set path, and the auxiliary equipment is moved along the set path.

* * * * *